United States Patent
Lee

(10) Patent No.: US 12,055,413 B2
(45) Date of Patent: Aug. 6, 2024

(54) APPARATUS AND METHOD FOR UPDATING DETAILED MAP

(71) Applicant: SK TELECOM CO., LTD., Seoul (KR)

(72) Inventor: Seong Soo Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 492 days.

(21) Appl. No.: 17/276,100

(22) PCT Filed: Jul. 2, 2019

(86) PCT No.: PCT/KR2019/007987
§ 371 (c)(1),
(2) Date: Mar. 12, 2021

(87) PCT Pub. No.: WO2020/071619
PCT Pub. Date: Apr. 9, 2020

(65) Prior Publication Data
US 2022/0042823 A1 Feb. 10, 2022

(30) Foreign Application Priority Data
Oct. 2, 2018 (KR) .................. 10-2018-0117864

(51) Int. Cl.
*G01C 11/02* (2006.01)
*G01C 21/00* (2006.01)
*G09B 29/00* (2006.01)

(52) U.S. Cl.
CPC .......... *G01C 21/3859* (2020.08); *G01C 11/02* (2013.01); *G01C 21/3815* (2020.08); *G09B 29/007* (2013.01)

(58) Field of Classification Search
CPC ............... G01C 21/3859; G01C 11/02; G01C 21/3815; G01C 11/30; G09B 29/007
(Continued)

(56) References Cited

U.S. PATENT DOCUMENTS 9,464,894 B2 * 10/2016 Napier .................. G01C 11/12
9,612,123 B1 * 4/2017 Levinson ............. G05D 1/0297
(Continued)

FOREIGN PATENT DOCUMENTS

KR  10-2015-0101009 A  9/2015
KR  10-1717118 B1  3/2017
(Continued)

OTHER PUBLICATIONS

PCT International Search Report and Written Opinion, PCT Application No. PCT/KR2019/007987, Oct. 7, 2019, 12 pages (with English translation of PCT International Search Report).

*Primary Examiner* — Hunter B Lonsberry
*Assistant Examiner* — Robert Louis Pinkerton
(74) *Attorney, Agent, or Firm* — WTA Patents

(57) ABSTRACT

In accordance with an aspect of the present disclosure, there is provided a method of updating a high definition map. The method comprises, acquiring two-dimensional images at a plurality of different locations by using a camera mounted on a vehicle; checking a moving trajectory of the camera for acquiring the two-dimensional images; generating a local landmark map by estimating, based on surface information of a road in the high definition map, a three-dimensional position of a landmark for a lane marking around the moving trajectory of the camera; and updating the high definition map based on the local landmark map.

20 Claims, 11 Drawing Sheets

(58) Field of Classification Search
USPC .......................................................... 701/450
See application file for complete search history.

(56) References Cited

U.S. PATENT DOCUMENTS

| | | | |
|---|---|---|---|
| 10,584,971 B1* | 3/2020 | Askeland | G01C 21/3859 |
| 10,816,993 B1* | 10/2020 | Tran | G06V 20/56 |
| 11,530,924 B2* | 12/2022 | Lee | G01C 21/3837 |
| 2016/0116294 A1* | 4/2016 | Raghu | G01C 21/30 |
| | | | 701/523 |
| 2017/0010618 A1* | 1/2017 | Shashua | G01C 21/34 |
| 2018/0024562 A1* | 1/2018 | Bellaiche | G06T 7/73 |
| | | | 701/26 |
| 2018/0188743 A1* | 7/2018 | Wheeler | G05D 1/0276 |
| 2018/0190016 A1* | 7/2018 | Yang | G01C 11/12 |
| 2018/0202814 A1* | 7/2018 | Kudrynski | G01C 21/30 |
| 2019/0258251 A1* | 8/2019 | Ditty | G05D 1/0248 |
| 2019/0271550 A1* | 9/2019 | Breed | F21S 41/13 |
| 2020/0098135 A1* | 3/2020 | Ganjineh | G06F 16/587 |
| 2020/0284590 A1* | 9/2020 | Chen | G01C 21/3841 |
| 2020/0393265 A1* | 12/2020 | Piao | G01C 21/3815 |
| 2021/0001877 A1* | 1/2021 | Han | G01C 21/3822 |
| 2021/0004363 A1* | 1/2021 | Bailly | G06T 17/05 |
| 2021/0063200 A1* | 3/2021 | Kroepfl | G01C 21/387 |
| 2021/0183241 A1* | 6/2021 | Lee | G08G 1/0175 |
| 2021/0207977 A1* | 7/2021 | Lee | G06V 20/588 |

FOREIGN PATENT DOCUMENTS

| | | |
|---|---|---|
| KR | 10-2017-0082165 A | 7/2017 |
| KR | 10-1871441 B1 | 6/2018 |
| WO | WO 2018/017793 A1 | 1/2018 |
| WO | WO 2018-0104563 A2 | 6/2018 |

* cited by examiner

*FIG. 7A* *FIG. 7B*
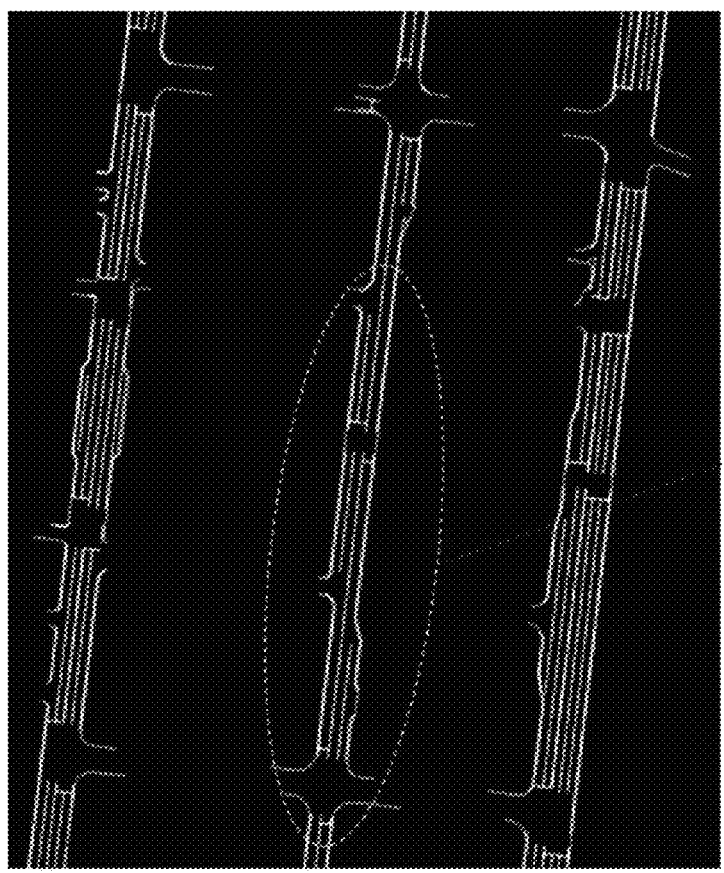
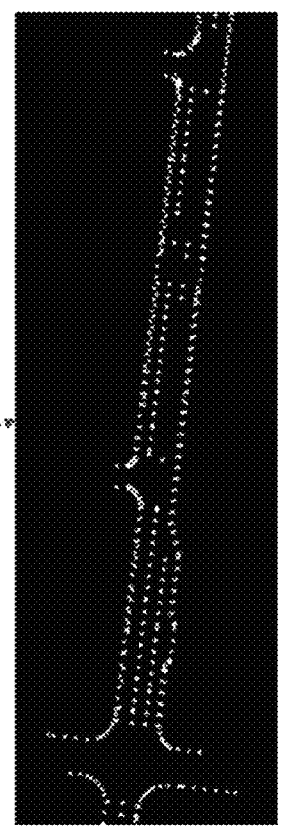

APPARATUS AND METHOD FOR UPDATING DETAILED MAP

CROSS-REFERENCE TO RELATED APPLICATION

This application claims priority to Korean Patent Application No. 10-2018-0117864, filed on Oct. 2, 2018. The entire contents of the application on which the priority is based are incorporated herein by reference.

TECHNICAL FIELD

The present disclosure relates to an apparatus and a method for updating a high definition map that is provided when driving a vehicle.

BACKGROUND

In general, a vehicle means a transportation machine driving roads or tracks using fossil fuel, electricity, and the like as a power source.

The vehicle has been developed to provide various functions to a driver along development of technology. Particularly, according to the trend of vehicle electrification, a vehicle with an Active Safety System (ASS) that operates to prevent an accident immediately before or at the time of the accident has appeared.

Further, in recent years, in order to alleviate burdens on the driver and to enhance convenience, researches into a vehicle with an Advanced Driver Assistance System (ADAS) that actively provides information on a driving environment, such as vehicle condition, a driver's condition, and a surrounding environment, and the like are being actively conducted.

Since the ADAS directly controls the vehicle by taking over part or all of right to control the driver's vehicle, precise control in consideration of the driver's safety is required. To this end, the ADAS tends to use a high definition map in which more precise data is accumulated than a conventional map used for an automotive navigation system and the like.

SUMMARY

The problem to be solved by the present disclosure is to provide a high definition map updating apparatus for updating a high definition map by using a position of a lane marking estimated based on surface information of a road on the high definition map and a method thereof.

In accordance with an aspect of the present disclosure, there is provided a method of updating a high definition map. The method comprises, acquiring two-dimensional images at a plurality of different locations by using a camera mounted on a vehicle; checking a moving trajectory of the camera for acquiring the two-dimensional images; generating a local landmark map by estimating, based on surface information of a road in the high definition map, a three-dimensional position of a landmark for a lane marking around the moving trajectory of the camera; and updating the high definition map based on the local landmark map.

In accordance with another aspect of the present disclosure, there is provided an apparatus for updating a high definition map. The apparatus comprises, a moving trajectory checking unit configured to check a moving trajectory of a camera for acquiring two-dimensional images at a plurality of different locations; a local landmark map generating unit configured to generate a local landmark map by estimating, based on surface information of a road in the high definition map, a three-dimensional position of a landmark for a lane marking around the moving trajectory of the camera; and an updating unit configured to update the high definition map based on the local landmark map.

The high definition map updating apparatus and method according to one embodiment may be mounted on a vehicle in actual driving and update the high definition map in real time without a separate pre-operation for updating the high definition map. Through this, it is possible to reduce a cost and time for updating the high definition map. In addition, since a position of a lane marking where matching feature points with each other through images is not easy is estimated based on the surface information of the road, accuracy of the update of the high definition map may be improved.

BRIEF DESCRIPTION OF THE DRAWINGS

FIGS. 7A and 7B show a diagram illustrating a second local landmark map that a local landmark map generating unit generated based on surface information of a road according to one embodiment of the present disclosure.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1A:
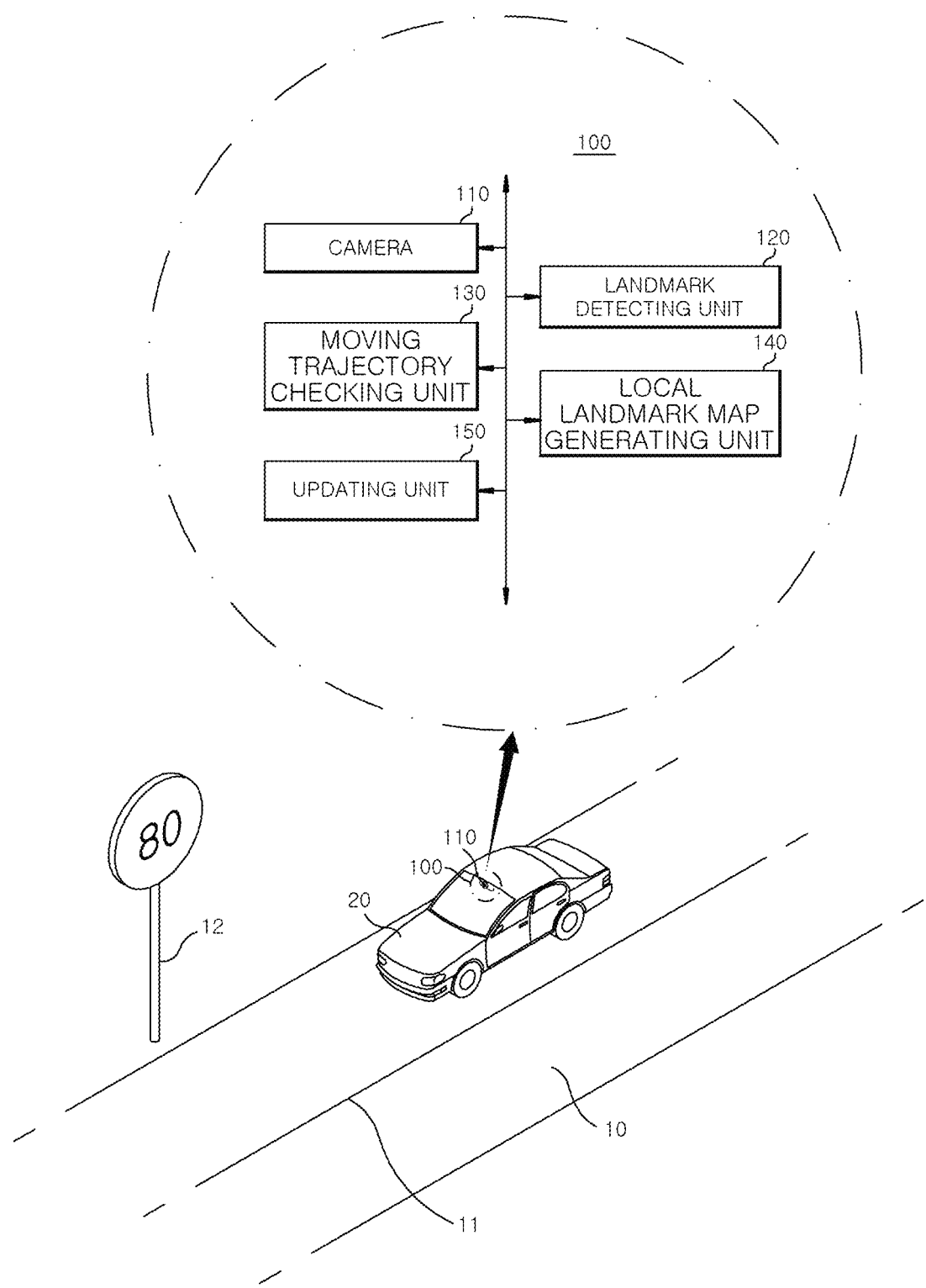
FIG. 1A shows a functional block diagram of a high definition map updating apparatus according to various embodiments of the present disclosure.
Figure 1B:
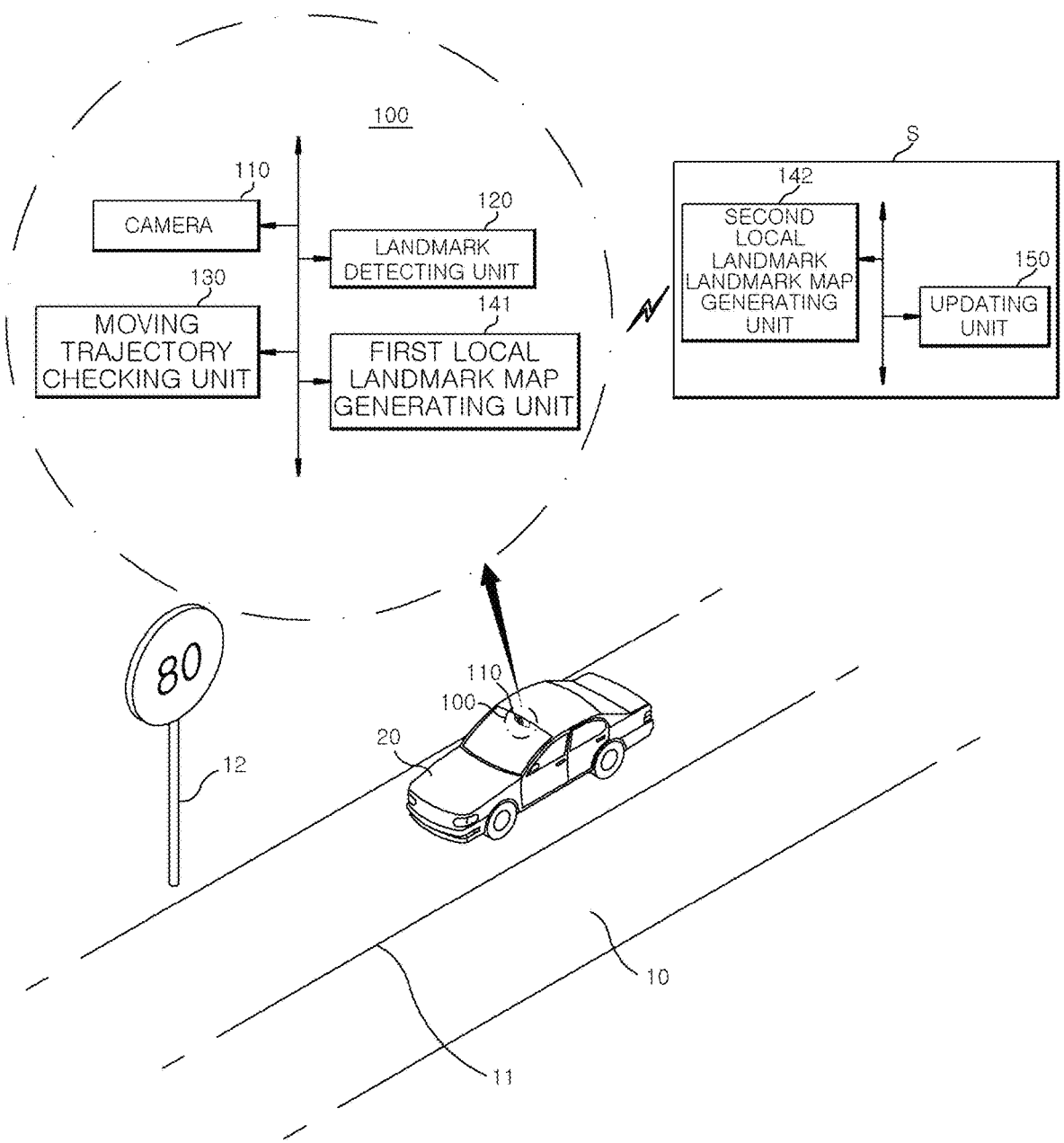
FIG. 1B shows a functional block diagram of a high definition map updating apparatus according to various embodiments of the present disclosure.
Figure 2:
FIG. 2 shows a diagram illustrating a two-dimensional image captured by a camera according to one embodiment of the present disclosure.

FIGS. 1A and 1B show functional block diagrams of a high definition map updating apparatus 100 according to various embodiments of the present disclosure, and FIG. 2 shows a diagram illustrating a two-dimensional image captured by a camera according to one embodiment of the present disclosure.

The high definition map updating apparatus 100, all or part of which is mounted on a vehicle, according to one embodiment of the present disclosure may indicate an apparatus that updates a high definition map based on surrounding information of the vehicle that is acquired during traveling of the vehicle.

Herein, the high definition map may indicate a map that has high accuracy for safe and precise control over the vehicle. Specifically, the high definition map may include information on an altitude, slope, curvature, the number of traffic lanes, and the like, as well as a plane location of a road. In addition, the high definition map may further include information on road facilities such as a traffic sign, a traffic light, a traffic signpost, a guardrail, and the like.

The high definition map may consist of a point cloud which is a set of a plurality of points obtained by scanning a road through a laser scanner or the like, and each point included in the point cloud may have three-dimensional spatial coordinates on a reference coordinate system. The point cloud is filtered so that only meaningful data remains by using a noise filter, and the high definition map may be constructed by marking a landmark onto each point corresponding to the meaningful data.

The landmark marked in this way may include a structural object for various types of the road facilities such as the traffic sign, the traffic light, the traffic signpost, the guardrail, and the like around the road, and a lane marking including a stop line and a road edge on a driving road. In particular, a landmark for the structural object may be expressed on the high definition map in the form of points, and a landmark for the lane marking may be expressed in the form of lines.

In addition, a vehicle equipped with the high definition map updating apparatus 100 may be a general private or commercial vehicle that is widely spread and used rather than a vehicle specially prepared for generating the high definition map, such as an MMS vehicle.

Referring to FIG. 1A, the high definition map updating apparatus 100 according to one embodiment of the present disclosure may include a camera 110, a landmark detecting unit 120, a moving trajectory checking unit 130, a local landmark map generating unit 140, and an updating unit 150, and the above-described components may be provided in a vehicle. Alternatively, all or part of the components of the high definition map updating apparatus 100 according to another embodiment other than the camera 110 may be installed in another place spaced apart from the vehicle. Referring to FIG. 1B, the high definition map updating apparatus 100 according to another embodiment includes the camera 110, the landmark detecting unit 120, the moving trajectory checking unit 130, and a first local landmark map generating unit 141 of the local landmark map generating unit 140 integrally installed on each of a plurality of vehicles, and a second local landmark map generating unit 142 of the local landmark map generating unit 140 and the updating unit 150 implemented in a high definition map updating server S in a remote location. In this case, the second local landmark map generating unit 142 and the updating unit 150 may update the high definition map by using information received from the high definition map updating apparatus 100 on each of the plurality of the vehicles. And, the high definition map may be stored in the high definition map updating server S, but is not limited thereto.

At this time, it is possible to exchange data between components spaced apart from each other among the components of the high definition map updating apparatus 100 by using wireless communication, and in this case, the high definition map updating apparatus 100 may include communication hardware for the wireless communication. The components at the vehicle and the components at the high definition map updating server S of the high definition map updating apparatus 100 according to another embodiment may communicate with each other through a base station by adopting a publicly known communication method such as CDMA, GSM, W-CDMA, TD-SCDMA, WiBro, LTE, EPC, and the like. Alternatively, the components at the vehicle and the components at the high definition map updating server S of the high definition map updating apparatus 100 according to another embodiment may communicate with each other within a predetermined distance by adopting a communication method such as a wireless LAN, Wi-Fi, Bluetooth, Zigbee, Wi-Fi Direct (WFD), Ultra-Wide Band (UWB), Infrared Data Association (IrDA), Bluetooth Low Energy (BLE), and Near Field Communication (NFC), and the like. However, the method in which each component of the high definition map updating apparatus 100 communicates is not limited to the embodiments described above.

In embodiments of FIGS. 1A and 1B, each component of the high definition map updating apparatus 100 may be implemented by a computing device including a microprocessor, for example, be implemented by at least one of a Central Processing Unit (CPU) and a Graphic Processing Unit (GPU). Alternatively, at least two of each component of the high definition map updating apparatus 100 may be implemented as a System on Chip (SoC).

The camera 110 may be provided to face forward, sideways, and/or rearward from the vehicle, thereby capturing a two-dimensional image in a corresponding direction. As described above, since the camera 110 of the high definition map updating apparatus 100 is mounted on the vehicle, the two-dimensional image captured by the camera 110 may be an image in which driving information around the vehicle being driven is expressed in two dimensions.

The camera 110 may repeatedly acquire a two-dimensional image for each frame defined by a predetermined time interval. Hereinafter, among two two-dimensional images successively acquired by the camera 110, an image acquired first is referred to as a first frame image, and an image acquired later is referred to as a second frame image.

The landmark detecting unit 120 may detect a landmark from the two-dimensional image acquired by the camera 110. Herein, the landmark may include a structural object around a road and a lane marking object for a lane marking on the road.

To this end, the landmark detecting unit 120 may extract a feature point in the two-dimensional image acquired by the camera 110. When the feature point is extracted from the two-dimensional image, the landmark detecting unit 120 may detect the landmark in the two-dimensional image by inputting the extracted feature point into a landmark identification algorithm. In this case, the landmark identification algorithm may be generated through a machine learning technique such as deep learning, and may indicate an algorithm that takes a position of the feature point as an input value and a landmark corresponding to the input feature point as an output value.

Referring to FIG. 2, the landmark detecting unit 120 may detect, in the two-dimensional image captured by the camera 110, traffic lights shown in white boxes, traffic signs shown in gray boxes, and lane markings shown as white straight lines on the road, and the like as landmarks.

If the camera 110 acquires a two-dimensional image for every frame, the landmark detecting unit 120 may detect a landmark by extracting a feature point for each two-dimensional image.

If the camera 110 acquires a two-dimensional image every frame, the moving trajectory checking unit 130 may check a moving trajectory of the camera 110 for acquiring the two-dimensional images as the vehicle on which the camera 110 is mounted moves.

The moving trajectory checking unit 130 according to one embodiment may compare a plurality of the acquired two-dimensional images, thereby obtaining the moving trajectory of the vehicle, specifically, the moving trajectory of the camera 110 of the high definition map updating apparatus 100 mounted on the vehicle.

To this end, the moving trajectory checking unit 130 may match corresponding feature points in separate two-dimensional images with each other, and then check the moving trajectory of the camera 110. To this end, the moving trajectory checking unit 130 according to one embodiment may employ a Simultaneous Localization and Mapping (SLAM) algorithm, which is a method of simultaneously estimating a location and generating a map.

Further, the moving trajectory checking unit 130 according to another embodiment may check the moving trajectory of the camera 110 by using at least one of an Inertial Navigation System (INS) and a Real Time Kinematic (RTK) GPS. In a case of using the INS, the moving trajectory checking unit 130 may check the moving trajectory of the camera 110 by integrating a three-dimensional acceleration according to a movement of the camera 110 to obtain a driving distance. Alternatively, in a case of using the RTK GPS, the moving trajectory checking unit 130 may check the moving trajectory of the camera 110 in real time by using a correction value for a phase of a carrier wave of a reference station having location information.

Furthermore, in order to solve a problem of scale ambiguity according to a position of the camera 110, the moving trajectory check unit 130 may check the moving trajectory of the camera 110 by referring to a detection result of a wheel speed of the vehicle, a yaw rate, and/or an Inertial Measurement Unit (IMU).

The local landmark map generating unit 140 may generate a local landmark map including change information on an area that needs to be updated on the high definition map. Specifically, the local landmark map generating unit 140 may generate the local landmark map by estimating a three-dimensional position of a landmark for a lane marking around the moving trajectory of the camera 110 based on surface information of the road on the high definition map.

The local landmark map generating unit 140 according to one embodiment may generate a first local landmark map in a three-dimensional form corresponding to the moving trajectory of the camera 110 by using a landmark for a structural object among landmarks on the two-dimensional image, and generate a second local landmark map by estimating a three-dimensional position of a landmark for a lane marking in the first local landmark map based on the surface information of the road in the high definition map. In a case of the local landmark map generating unit 140 according to the embodiment of FIG. 1B, the first local landmark map generating unit 141 may generate the above-described first local landmark map, and the second local landmark map generating unit 142 may generate the above-described second local landmark map.

Hereinafter, a method of generating the first local landmark map will be described with reference to FIGS. 3 and 4, and a method of generating the second local landmark map will be described with reference to FIGS. 5 to 8.

Figure 3:
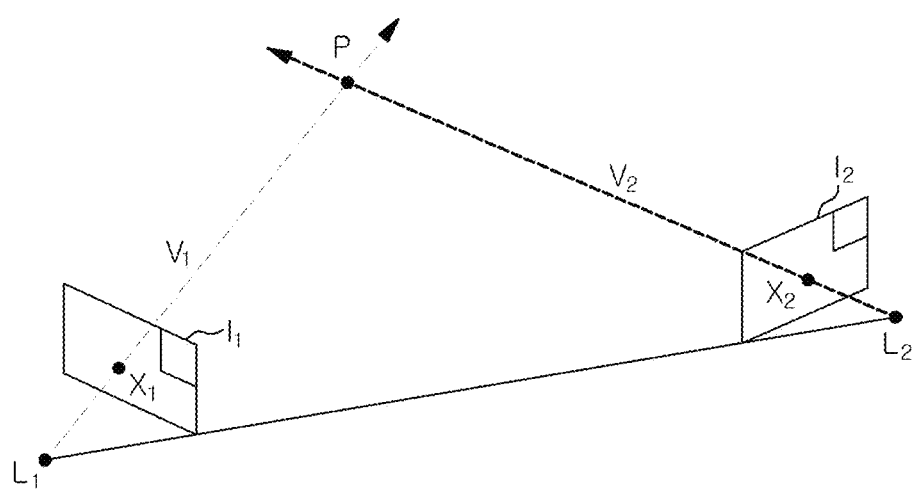
FIG. 3 shows a diagram illustrating a method of acquiring a three-dimensional position of a landmark by using two images.
Figure 4:
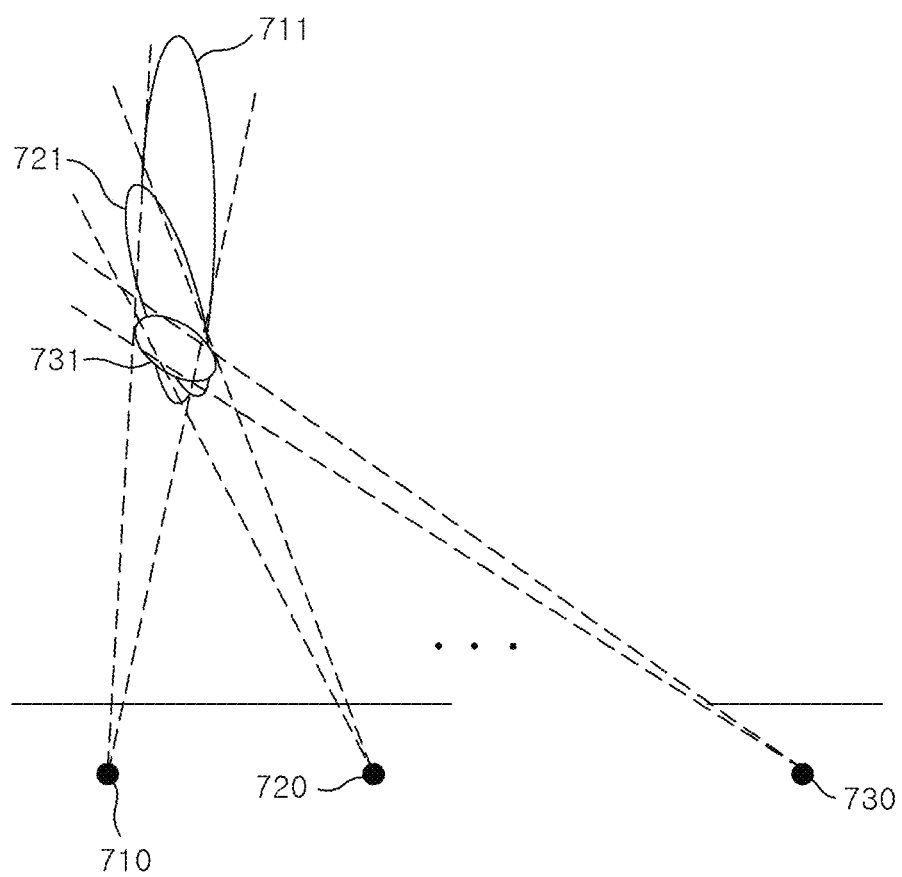
FIG. 4 shows a diagram illustrating a method of estimating, by a local landmark map generating unit, a three-dimensional position of a landmark for a structural object according to one embodiment of the present disclosure.

FIG. 3 shows a diagram illustrating a method of acquiring a three-dimensional position of a landmark by using two images, and FIG. 4 shows a diagram illustrating a method of estimating, by the local landmark map generating unit 140, a three-dimensional position of a landmark for a structural object according to one embodiment of the present disclosure.

The local landmark map generating unit 140 may estimate a position of a first landmark, which is a landmark for a structural object on a two-dimensional image, in order to generate a first local landmark map. To this end, the local landmark map generating unit 140 according to one embodiment of the present disclosure may use a triangulation. Specifically, the local landmark map generating unit 140 may recognize the identical first landmark from at least two images captured at different locations, and apply the triangulation to the recognition result to estimate the three-dimensional position of the first landmark in the local landmark map.

Referring to FIG. 3, the camera 110 may capture a first landmark at a first location $L_1$ to obtain a first image $I_1$, and capture the first landmark at a second location $L_2$ to obtain a second image $I_2$. In this case, the local landmark map generating unit 140 may obtain a vector $V_1$ passing, from the first location $L_1$, through a pixel $X_1$ corresponding to the first landmark on the first image $I_1$, and obtain a vector $V_2$ passing, from the second location $L_2$, through a pixel $X_2$ corresponding to the first landmark on the second image $I_2$. Thereafter, the local landmark map generating unit 140 may estimate an intersection of the vectors $V_1$ and $V_2$ as the position P of the first landmark in the three-dimensional space.

When estimating the position of the first landmark according to the above-described method, accuracy of the determined position of the first landmark may be affected by the number of images used to recognize the first landmark. As described above, since at least two two-dimensional images are used to estimate the position of the first landmark in the three-dimensional space, an average of a plurality of three-dimensional positions determined from a plurality of two-dimensional images may be estimated as the position of the first landmark in the three-dimensional space to reduce a measurement error.

In addition, as a distance between the plurality of photographing locations at which the plurality of two-dimensional images are captured by the camera 110 increases, the accuracy of the three-dimensional position of the first landmark determined by the above method may increase. This is because, as the distance between the photographing locations increases, a difference in pixels of the first landmark recognized on the two-dimensional image decreases, and thus an error of the three-dimensional position of the first landmark determined based on the above method decreases. For example, if the difference in pixels of a position of a first landmark in two two-dimensional images captured at two locations separated by one meter is one pixel, and the difference in pixels of the position of the first landmark in two two-dimensional images captured at two locations separated by two meters is one pixel, the latter case has higher accuracy, than the former case, of the three-dimensional position of the first landmark determined based on each case.

In consideration of this, the local landmark map generating unit 140 may increase the accuracy of the position of the first landmark, and may determine whether to add the first landmark into the first local landmark map according to the accuracy.

Referring to FIG. 4, two-dimensional images may be captured at a plurality of locations 710, 720, and 730, respectively, and an error range 711 of a position of a first landmark estimated from the two-dimensional image captured at the first location 710 is relatively large. However, it may be identified that an error range 721 of the position of the first landmark estimated considering the two-dimensional image captured at the second location 720 with the two-dimensional image captured at the first location 710 is smaller than the error range 711, and an error range 731 of the position of the first landmark estimated considering the two-dimensional images captured at the locations 710, 720, and 730 is further decreased.

Based on this, the local landmark map generating unit 140 may determine a first landmark of which an error range (for example, covariance of a position of a landmark in the local landmark map, which is expressed in the form of a random variable) is less than a predetermined threshold value as an effective first landmark, and the updating unit 150 to be described later may update the high definition map by using the effective first landmark.

Given the above-described covariance, the local landmark map generating unit 140 according to one embodiment may obtain the position of the first landmark in the first local landmark map more accurately by using a Kalman filter. In this process, Equation 1 below may be used.

$$d = \lambda R^{-1} K^{-1} (u, v, 1)^T \qquad \text{[Equation 1]}$$

Herein, d denotes a three-dimensional direction vector from a lens of the camera 110 to the position of the landmark, and $\lambda$ is a constant for normalization purposes that makes $d = (a, b, c)^T$ into a unit vector. In addition, R is a three-dimensional rotation matrix representing an orientation angle of the camera 110. Further, K denotes a calibration matrix regarding internal parameters of the camera 110 assuming a pin-hole model. Furthermore, P* expressed in three-dimensional coordinates may be obtained according to Equations 2 to 4 below.

$$P^* = A^{-1} b \qquad \text{[Equation 2]}$$

$$A = \begin{pmatrix} \sum_i^n (1-a_i^2) & -\sum_i^n (a_i b_i) & -\sum_i^n (a_i c_i) \\ -\sum_i^n (a_i b_i) & \sum_i^n (1-b_i^2) & -\sum_i^n (b_i c_i) \\ -\sum_i^n (a_i c_i) & -\sum_i^n (b_i c_i) & \sum_i^n (1-c_i^2) \end{pmatrix} \qquad \text{[Equation 3]}$$

$$b = \begin{pmatrix} \sum_i^n [(1-a_i^2)x_i - a_i b_i y_i - a_i c_i z_i] \\ \sum_i^n [-a_i b_i x_i + (1-b_i^2)y_i - b_i c_i z_i] \\ \sum_i^n [-a_i c_i x_i - b_i c_i x_i + (1-c_i^2)z_i] \end{pmatrix} \qquad \text{[Equation 4]}$$

Herein, $(x_i, y_i, z_i)$ indicates an i-th position among a plurality of positions of the camera 110. The covariance of the three-dimensional position P of the first landmark estimated based on the Equations 2 to 4 is $A^{-1}$, which represents the error of the three-dimensional position of the first landmark on the two-dimensional image captured at a first photographing location (i=1).

On the other hand, when a three-dimensional transformation matrix T is applied to the three-dimensional position P of the first landmark based on a coordinate system of the camera 110, the three-dimensional coordinates $P_L$ of the first landmark based on a coordinate system of the high definition map may be obtained. At this time, since the transformation matrix T has an error according to the position and the orientation angle of the camera 110, the local landmark map generating unit 140 may obtain covariance $C_{PL}$ of the $P_L$ to which a concept of error propagation is applied. The covariance $C_{PL}$ of $P_L$ may be obtained according to Equation 5.

$$C_{PL} = J_1 \times A^{-1} \times J_1^T + J_2 \times C^T \times J_2^T \qquad \text{[Equation 5]}$$

Herein, $J_1$ indicates a partial derivative (a Jacobian matrix) of a function T×P for the three-dimensional position P, $C^T$ indicates covariance of the three-dimensional transformation matrix T, and $J_2$ indicates the partial derivative of the function T×P for the three-dimensional transformation matrix T.

Heretofore, the method of generating the first local landmark map has been described, which may be performed by the local landmark map generating unit 140 in the case of FIG. 1A, or by the first local landmark map generating unit 141 of the local landmark map generating unit 140 in the case of FIG. 1B. In addition, in the case of FIG. 1B, the generated first local landmark map may be transmitted from a vehicle to the high definition map updating server S.

When the first local landmark map is generated according to the above-described method, the local landmark map generating unit 140 may estimate a three-dimensional position of the landmark for a lane marking in the first local landmark map to generate a second local landmark map.

Figure 5:
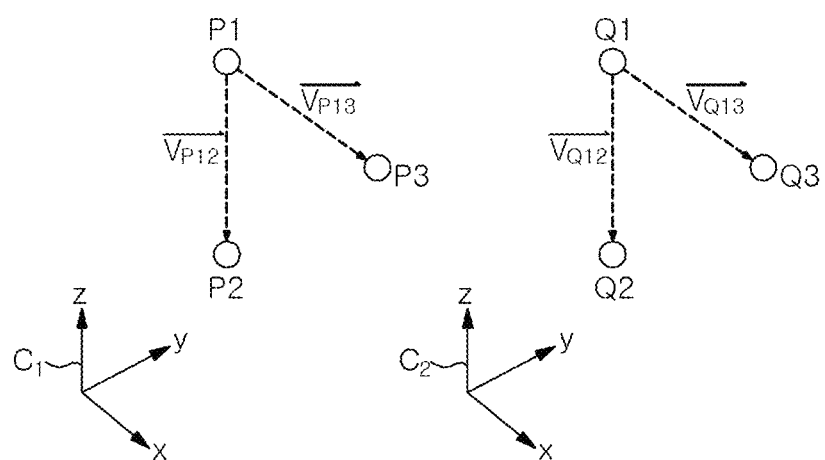
FIG. 5 shows a diagram illustrating a method of matching, by a local landmark map generating unit, a high definition map with a first local landmark map according to one embodiment of the present disclosure.
Figure 6:
FIG. 6 shows a diagram illustrating a method of generating, by a local landmark map generating unit, a second local landmark map based on surface information of a road according to one embodiment of the present disclosure.
Figure 8:
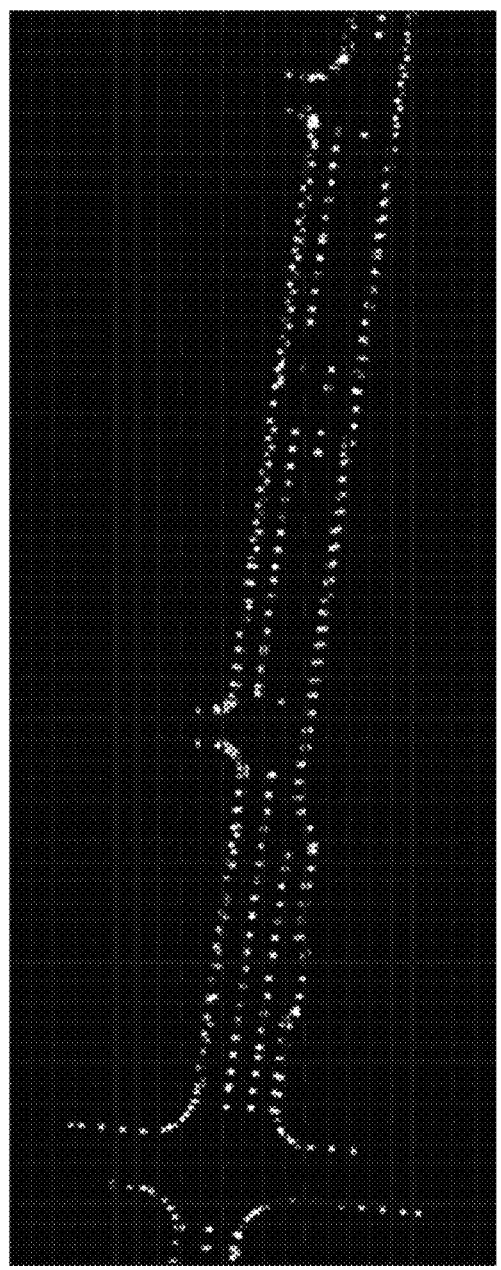
FIG. 8 shows a diagram illustrating a method of determining, by a local landmark map generating unit, validity of the second local landmark map of FIGS. 7A and 7B according to one embodiment of the present disclosure.

FIG. 5 shows a diagram illustrating a method of matching, by the local landmark map generating unit 140, a high definition map with a first local landmark map according to one embodiment of the present disclosure, FIG. 6 shows a diagram illustrating a method of generating, by the local landmark map generating unit 140, a second local landmark map based on surface information of a road according to one embodiment of the present disclosure, FIGS. 7A and 7B show a diagram illustrating the second local landmark map that the local landmark map generating unit 140 generated based on the surface information of the road according to one embodiment of the present disclosure, and FIG. 8 shows a diagram illustrating a method of determining, by the local landmark map generating unit 140, validity of the second local landmark map of FIGS. 7A and 7B according to one embodiment of the present disclosure.

In order to generate the second local landmark map, the local landmark map generating unit 140 may match the previously generated first local landmark map with the high definition map. Both the high definition map and the first local landmark map may be defined by a three-dimensional coordinate system, and a relationship between the two coordinate systems may be defined by a transformation matrix including a rotation component and a translation component. Accordingly, the local landmark map generating unit 140 may obtain a transformation matrix T* by using Equation 6 to match the high definition map with the first local landmark map.

$$T^* = \underset{T}{\operatorname{argmin}} \sum_k (Z_k - TP_k)^T (C_{Z_k} + JC_{P_k}J^T)^{-1}(Z_k - TP_k)$$ [Equation 6]

Herein, $Z_k$ indicates a position of a first landmark in the high definition map, $P_k$ indicates a position of the first landmark in the first local landmark map, and T indicates the transformation matrix that converts the position $P_k$ of the first landmark in the first local landmark map to coordinates of the coordinate system of the high definition map. $C_{Z_k}$ and $C_{P_k}$ each denotes a covariance matrix representing distribution patterns of $Z_k$ and $P_k$, and J denotes a partial derivative of a function $T \times P_k$ for the three-dimensional transformation matrix T. In addition, k denotes an index for each of a plurality of the first landmarks.

In Equation 6, a cost function for each first landmark $P_k$ in the first local landmark map and the corresponding first landmark $Z_k$ in the high definition map is defined to the right of a sigma ($\Sigma$) symbol. The local landmark map generating unit 140 may obtain the transformation matrix T* in which a sum of values of the cost functions is minimum.

In order to obtain a solution of Equation 6, the local landmark map generating unit 140 may select at least one of publicly known algorithms, for example, a Gauss Newton algorithm or a Levenberg-Marquardt algorithm.

The local landmark map generating unit 140 according to one embodiment may adopt an Interactive Closest Point (ICP) algorithm to match points in the high definition map with points in the first local landmark map. According to the ICP algorithm, if there are two point cloud sets to mutually match with each other, and one point in one point cloud set is matched to one point in the other point cloud set, two points with the closest Euclidean distance to each other may be matched with each other.

In this case, the local landmark map generating unit 140 according to one embodiment may match points with each other in consideration of a type and an attribute of the first landmark. For example, if the first landmark is a traffic light, the local landmark map generating unit 140 may consider whether the first landmark is a two-color traffic light, a three-color traffic light, or a four-color traffic light to match points in the high definition map with points in the first local landmark map.

Further, the local landmark map generating unit 140 according to one embodiment may match two points with each other in consideration of a positional relationship of at least three first landmarks, that is, a geometric relationship between a plurality of the first landmarks.

Referring to FIG. 5, first landmarks $P_1$, $P_2$, and $P_3$ are positioned in a first local landmark map following a first coordinate system $C_1$, and first landmarks $Q_1$, $Q_2$, and $Q_3$, corresponding to $P_1$, $P_2$, and $P_3$ described above, are positioned in a high definition map following a second coordinate system C2. In order to determine validity of a correspondence between $P_1$ and $Q_1$, the local landmark map generating unit 140 may obtain a vector $V_{P12}$ and a vector $V_{P13}$ based on $P_1$, and a vector $V_{Q12}$ and a vector $V_{Q13}$ based on $Q_1$. If an inner product between the vectors is less than a threshold value ($\vec{V}_{Pij} \cdot \vec{V}_{Qij} < \varepsilon$) and a difference between lengths of the vectors is less than a threshold value ($|\|\vec{V}_{Pij}\| \cdot \|\vec{V}_{Qij}\|| < \varepsilon$), the local landmark map generating unit 140 may determine that the corresponding correspondence is effective. By setting these geometric constraints, the local landmark map generating unit 140 may remove an erroneous outlier more easily when searching for a corresponding point by the ICP, and as a result, matching performance between the first local landmark map and the high definition map may be improved.

When the high definition map and the first local landmark map are matched, the local landmark map generating unit 140 may estimate a three-dimensional position of a second landmark in the first local landmark map.

Even if a moving trajectory of the camera 110 is accurately known, it is almost impossible to find a point corresponding to the second landmark for a road on the two-dimensional image, and thus it is difficult to apply a method of estimating a three-dimensional position by using a triangulation. Accordingly, the local landmark map generating unit 140 according to one embodiment may estimate the three-dimensional position of the second landmark in the first local landmark map by using surface information of the road. Herein, the surface information of the road may include information on a curvature on a surface of the road.

In order to consider the surface information of the road, the local landmark map generating unit 140 may first divide an area corresponding to the moving trajectory of the camera 110 into a plurality of grid planes. In this case, the area corresponding to the moving trajectory of the camera 110 may be determined based on a geographical position where the first local landmark map indicates.

Thereafter, the local landmark map generating unit 140 may obtain a plane equation of each of the plurality of grid planes divided according to Equation 7.

$$ax+by+cz+d=0$$ [Equation 7]

Herein, a, b, c, and d may indicate coefficients of the plane equation. The local landmark map generating unit 140 may obtain the coefficients a, b, c, and d by inputting at least four position information existing on each grid plane, that is three-dimensional position coordinates (x, y, z) of at least the four points included in point clouds, into Equation 7.

If there is a grid plane including three or less position information among a plurality of the grid planes, the local landmark map generating unit 140 may determine a plane equation of an adjacent grid plane as a plane equation of the corresponding grid plane.

Thereafter, the local landmark map generating unit 140 may obtain a vector from an origin of a coordinate system of the camera 110 to a second landmark on a two-dimensional image by using a rotation matrix R and a translation matrix T indicating an orientation angle and a position of the camera 110 based on a coordinate system of the high definition map. Specifically, the local landmark map generating unit 140 may obtain a $P_{ray}$ passing through a pixel corresponding to the second landmark in the two-dimensional image from the origin of the coordinate system of the camera 110 according to Equation 8.

$$P_{ray}=R^{-1}(K^{-1}m-T)$$ [Equation 8]

Herein, $P_{ray}$ denotes a vector defined as a matrix $[x,y,z]^T$, and R and T denote the three-dimensional rotation matrix and translation matrix representing the orientation angle and the position of the camera 110 in a reference coordinate system of the high definition map. Further, K denotes an intrinsic parameter matrix (3×3) of the camera 110, and m denotes coordinates of a pixel corresponding to the second landmark in the two-dimensional image.

The obtained $P_{ray}$ may be illustrated as a dotted arrow in FIG. 6.

FIGS. 7A and 7B illustrates a result obtained according to the above-described method. Specifically, FIG. 7A shows a diagram illustrating a top view image of the high definition map, and FIG. 7B shows a diagram illustrating a top view image of a result estimating a three-dimensional position of the second landmark in the first local landmark map based on the surface information of the road in the high definition map. It may be seen that positions and shapes between the second landmark for a lane marking illustrated in FIG. 7A and the second landmark for a lane marking illustrated in FIG. 7B are similar.

In addition, the local landmark map generating unit 140 may determine validity of the estimated position of the second landmark. To this end, the local landmark map generating unit 140 according to one embodiment may accumulate the three-dimensional positions of the second landmark estimated from a plurality of two-dimensional images acquired by separate cameras 110 mounted on separate vehicles to determine the validity.

If the high definition map updating apparatus 100 is implemented as illustrated in FIG. 1B, a plurality of two-dimensional images may be obtained by separate cameras 110 mounted on each of a plurality of vehicles. In this case, the first local landmark map generating unit 141 of the high definition map updating apparatus 100 mounted on each vehicle may generate a first local landmark map based on separate two-dimensional images. The second local landmark map generating unit 142 may estimate a three-dimensional position of the second landmark for each of the first local landmark maps generated by the first local landmark map generating units 141 installed on the separate vehicles and may accumulate the estimated results thereof.

To this end, the second local landmark map generating unit 142 may divide the first local landmark map into grids. Referring to FIG. 8, the first local landmark map illustrated in FIG. 7B may be divided into grids according to a predetermined interval. The second local landmark map generating unit 142 may accumulate and count, for each grid, three-dimensional positions of the second landmark estimated based on separate cameras 110. Through this, the second local landmark map generating unit 142 may generate a two-dimensional histogram for each grid, and determine a grid having a predetermined threshold value or more as an effective three-dimensional position of the second landmark. Herein, the threshold value may indicate the minimum number of the accumulation that may determine the grid as the three-dimensional position of the second landmark.

Through the above-described process, the local landmark map generating unit 140 may generate the second local landmark map by examining the validity of the three-dimensional position of the second landmark.

Heretofore, the method of generating the second local landmark map from the first local landmark map has been described, which may be performed by the local landmark map generating unit 140 in the case of FIG. 1A, or by the second local landmark map generating unit 142 of the local landmark map generating unit 140 in the case of FIG. 1B.

The updating unit 150 may update the high definition map by using the second local landmark map. Such updating may include adding a new landmark into the high definition map and removing a removal landmark from the high definition map.

In order to add the new landmark, the updating unit 150 may identify, based on the second local landmark map including a position, covariance, and attributes of a received landmark, a corresponding landmark in the high definition map. When the corresponding landmark in the high definition map is identified, the updating unit 150 may identify whether the received landmark is the same as the corresponding landmark based on a distance between the position of the received landmark and the position of the corresponding landmark in the high definition map.

In this case, the updating unit 150 according to one embodiment may obtain a distance based on probability by applying a Mahalanobis distance theory between the received landmark and the corresponding landmark in the high definition map. When two points $P_1$ and $P_2$ in a three-dimensional space have covariance $C_1$ and $C_2$, respectively, a Mahalanobis distance $D_m$ follows Equation 9.

$$D_m = \sqrt{(P_1-P_2)^T(C_1+C_2)^{-1}(P_1-P_2)} \text{[Equation 9]}$$

The updating unit 150 may determine that the two landmarks are identical if the obtained Mahalanobis distance is less than or equal to a predetermined threshold value. On the other hand, when the corresponding landmark is not identified in the high definition map or the Mahalanobis distance exceeds the predetermined threshold value, the updating unit 150 may determine the received landmark as the new landmark.

When the new landmark is determined, the updating unit 150 may update the high definition map by reflecting the new landmark into the high definition map. If the covariance of positions of the determined new landmark is less than or equal to a predetermined threshold value, the updating unit 150 according to one embodiment may add the new landmark, making a weight average into a position of the new landmark, into the high definition map. Through this, it is possible to increase reliability for the update of the high definition map.

On the other hand, according to the embodiment of FIG. 1B, the updating unit 150 provided in the high definition map updating server S may receive separate second local landmark maps based on two-dimensional images captured by the cameras 110 mounted on separate vehicles. In this case, the updating unit 150 may calculate a weight average of a plurality of positions of the new landmark received by reflecting the covariance. The updating unit 150 according to one embodiment may use a Kalman filter to obtain the weight average of the positions of the received new landmark. By using the Kalman filter to sequentially obtain the weight average of the positions of the new landmark in a receipt order, a speed of calculation may be increased, and a storage space may be more efficiently utilized.

After obtaining the weight average, the updating unit 150 may determine whether to add a new landmark into the high definition map by using the obtained weight average. The updating unit 150 according to one embodiment may add to the high definition map a new landmark, among new landmarks, determined based on a predetermined threshold value or higher two-dimensional images. In other words, when the number of landmark information received from the local landmark map generating unit 140 and used to obtain the weight average is equal to or greater than the predetermined threshold value, the updating unit 150 may add to the high definition map the new landmark of which position is the weight average.

Alternatively, if the covariance of the positions of the new landmark obtained by the Kalman filter is less than or equal to the predetermined threshold value, the updating unit 150 according to another embodiment may add into the high definition map the new landmark of which position is the obtained weight average. Through the above-described embodiments, the updating unit 150 may increase the reliability for the update of the high definition map by newly adding a reliable landmark into the high definition map. In addition, in order to remove the removal landmark, the updating unit 150 may receive, from the local landmark map generating unit 140, a second local landmark map including information that a specific landmark has been removed.

If the information on the removal landmark is received, the updating unit 150 may update the high definition map based on the received information. Specifically, the updating unit 150 may remove the removal landmark in the high definition map according to the received information.

Alternatively, according to the embodiment of FIG. 1B, the updating unit 150 provided in the high definition map updating server S may receive second local landmark maps including information on the removal landmark several times from a plurality of separate high definition map updating apparatus 100. In this case, the updating unit 150 according to one embodiment may remove, among the removal landmarks, a removal landmark determined based on a predetermined threshold value or higher two-dimensional images. In other words, the updating unit 150 may remove the removal landmark in the high definition map if the number of received information on the identical removal landmark is equal to or greater than the predetermined threshold value.

Furthermore, in order to add or remove the second landmark, the updating unit 150 may fit the second landmark in the second local landmark map. This will be described with reference to FIGS. 9A, 9B and 9C.

Figure 9A:
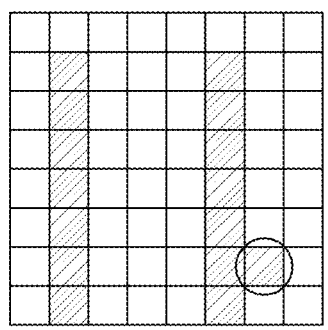
FIGS. 9A, 9B and 9C show a diagram illustrating a method of fitting, by an updating unit, a second landmark according to one embodiment of the present disclosure.
Figure 9B:
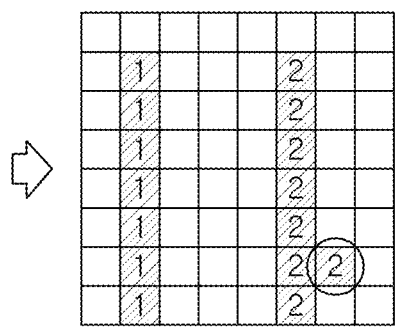
Figure 9C:
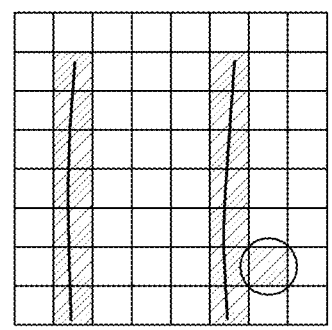

FIGS. 9A, 9B and 9C show a diagram illustrating a method of fitting, by the updating unit 150, a second landmark according to one embodiment of the present disclosure.

Referring to FIG. 9A, the updating unit 150 may first divide the second local landmark map into grids. In FIG. 9A, a hatched grid indicates an effective grid corresponding to a three-dimensional position of the second landmark.

Thereafter, the updating unit 150 may group adjacent grids among the effective grids. Referring to FIG. 9B, the updating unit 150 according to one embodiment may label the adjacent grids among the effective grids with the same number by using a connected component algorithm.

Finally, the updating unit 150 may fit the second landmark based on the grouped grids. Specifically, the updating unit 150 may first curve-fit the second landmark in a polynomial by using arbitrary k number of grids in a single group. When the curve fitting is completed, the updating unit 150 may calculate the number of grids existing on a corresponding curve. Thereafter, the updating unit 150 may repeatedly perform the above-described process a predetermined number of times. Finally, the updating unit 150 may determine a curve including the largest number of grids as a result of fitting the second landmark.

Referring to FIG. 9C, the updating unit 150 may perform the curve fitting for each of the effective grids labeled one and the effective grids labeled two. As a result, it may be seen that since an effective grid indicated by a circle does not exist on the curve, an effective grid in the circle is removed. Through this, a more accurate fitting of the second landmark may be possible.

The second landmark fitted according to the above-described method may also be added or removed in the high definition map according to the above-described updating method. In addition, the updating unit 150 according to one embodiment may divide the high definition map and the second local landmark map into grids with an identical interval, and then may update the high definition map by comparing corresponding grids. Specifically, the updating unit 150 may compare corresponding grids between the high definition map and the second local landmark map to identify whether or not the second landmark exists in the corresponding grids. If a result of the comparison for presence or absence of the second landmark between the corresponding grids is different with a probability equal to or greater than a threshold value, the updating unit 150 may update the high definition map for a geographic area indicated by the second local landmark map.

On the other hand, the update of the high definition map may be automatically performed by the updating unit 150 as described above, or may be performed by an administrator when information on a part that need to be updated (that is, information on a new landmark and a removal landmark) is provided to the administrator and the administrator check and finally approves the update.

When the update is completed, the high definition map updating apparatus 100 may further perform a new update based on the updated high definition map. To this end, the updating unit 150 according to the embodiment of FIG. 1B may provide the updated high definition map to the high definition map updating apparatus 100 through a communication means of the high definition map updating server S.

Heretofore, configurations and operations of the high definition map updating apparatus 100 has been described. Hereinafter, a method of updating the high definition map performed by the above-described high definition map updating apparatus 100 will be described with reference to FIG. 10.

Figure 10:
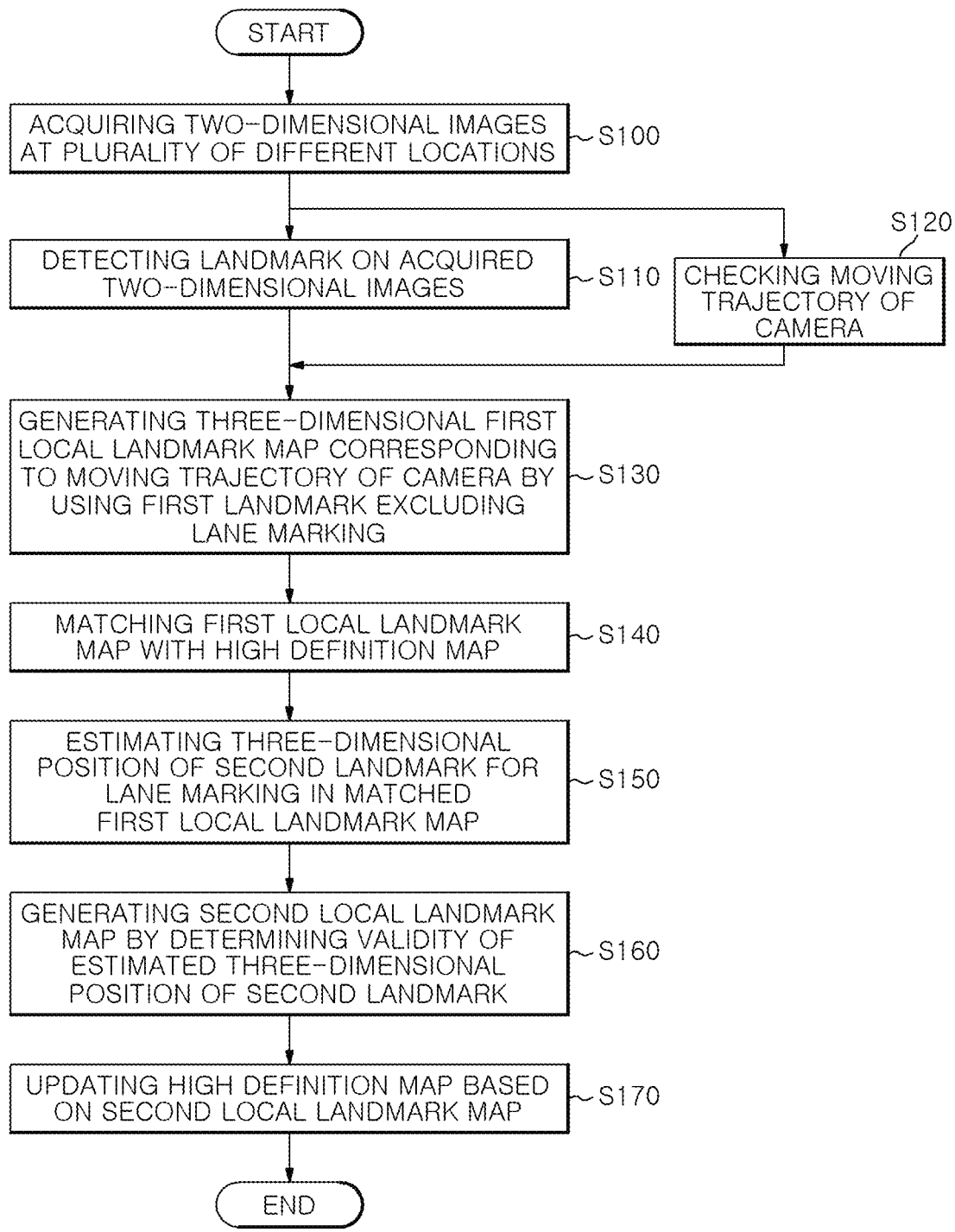
FIG. 10 shows a flowchart illustrating a high definition map updating method according to one embodiment of the present disclosure.

FIG. 10 shows a flowchart illustrating a high definition map updating method according to one embodiment of the present disclosure.

First, in a step S100, the high definition map updating apparatus 100 may acquire two-dimensional images at a plurality of different locations. Specifically, the camera 110 of the high definition map updating apparatus 100 mounted on the vehicle being driven may acquire two-dimensional images from a plurality of the different locations as according to a movement of the vehicle.

After acquiring the two-dimensional images, in a step S110, the high definition map updating apparatus 100 may detect a landmark on the acquired two-dimensional images. In this case, the detected landmark may include a first landmark for a structural object around a road and a second landmark for a lane marking on the road.

Further, in a step S120, the high definition map updating apparatus 100 may check a moving trajectory of the camera 110. To this end, the high definition map updating apparatus 100 according to one embodiment may check the moving trajectory of the camera 110 after matching feature points on a plurality of the two-dimensional images according to a SLAM algorithm. Alternatively, the high definition map updating apparatus 100 according to another embodiment may check the moving trajectory of the camera 110 by using at least one of an INS and a RTK GPS.

Thereafter, in a step S130, the high definition map updating apparatus 100 may generate a three-dimensional first local landmark map corresponding to the moving trajectory of the camera 110 by using the first landmark. Specifically, the high definition map updating apparatus 100 may generate the first local landmark map including a three-dimensional position of the first landmark by applying a triangulation to a plurality of the two-dimensional images.

When the first local landmark map is generated, in a step S140, the high definition map updating apparatus 100 may match the first local landmark map with the high definition map. In order to match with the high definition map, the high definition map updating apparatus 100 may consider a positional relationship of at least three corresponding points between the high definition map and the first local landmark map.

After completing the matching, in a step S150, the high definition map updating apparatus 100 may estimate a three-dimensional position of the second landmark for the lane marking in the matched first local landmark map. To this end, the high definition map updating apparatus 100 may use surface information of the road in the high definition map.

Thereafter, in a step S160, the high definition map updating apparatus 100 may generate a second local landmark map by determining validity of the estimated three-dimensional position of the second landmark. Specifically, the high definition map updating apparatus 100 may generate a histogram by accumulating the three-dimensional positions of the second landmark based on the two-dimensional images captured by the separate cameras 110, and may determine an effective three-dimensional position of the second landmark based on the generated histogram.

Finally, in a step S170, the high definition map updating apparatus 100 may update the high definition map based on the second local landmark map. Specifically, after fitting the second landmark from the second local landmark map, the high definition map updating apparatus 100 may update the high definition map by comparing corresponding grids between the high definition map and the second local landmark map.

The high definition map updating apparatus and method described above may be mounted on the vehicle in actual driving and update the high definition map in real time without a separate pre-operation for updating the high definition map. Through this, it is possible to reduce a cost and time for updating the high definition map. In addition, since a position of a lane marking where matching feature points through images is not easy is estimated based on the surface information of the road, accuracy of the update of the high definition map may be improved.

On the other hand, each of the steps included in the high definition map updating method according to one embodiment described above may be implemented in a computer-readable recording medium including the computer program programmed to execute each of the steps.

According to one embodiment, the above-described high definition map updating apparatus and the high definition map updating method may be used in various fields such as a home, an industrial site, or the like, thereby having industrial applicability.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. An apparatus for updating a high definition map, the apparatus comprising:
    a processor; and
    a memory storing instructions thereon, the instructions when executed by the processor cause the processor to:
        capture two-dimensional images at a plurality of different locations by using a camera mounted on a vehicle;
        determine a moving trajectory of the camera for capturing the two-dimensional images by at least comparing pixel locations of a first landmark other than lane markings within the two-dimensional images;
        generate a three-dimensional local landmark map corresponding to the moving trajectory of the camera by using the first landmark;
        generate a second local landmark map by estimating, based on surface information of a road in the high definition map, a three-dimensional position of a second landmark of a lane marking around the moving trajectory of the camera; and
        update the high definition map based on the local landmark map.

2. A method of updating a high definition map, the method comprising:
    capturing two-dimensional images at a plurality of different locations by using a camera mounted on a vehicle;
    determining a moving trajectory of the camera for capturing the two-dimensional images by at least comparing pixel locations of a first landmark other than lane markings within the two-dimensional images;
    generating a three-dimensional first local landmark map corresponding to the moving trajectory of the camera by using the first landmark;
    generating a second local landmark map by estimating, based on surface information of a road in the high definition map, a three-dimensional position of a second landmark of a lane marking around the moving trajectory of the camera; and
    updating the high definition map based on the second local landmark map.

3. The method of claim 2, wherein
    wherein the generating the three-dimensional first landmark map includes:
    capturing the first landmark at a first location to obtain a first image,
    capturing the first landmark at a second location to obtain a second image,
    determining a first vector passing, from the first location, through a first pixel $X_1$ corresponding to the first landmark on the first image,
    determining a second vector passing, from the second location, through a second pixel corresponding to the first landmark on the second image,
    estimating an intersection of the first vector and the second vector, and
    determining a three-dimensional position of the first landmark based on the estimated intersection.

4. The method of claim 2, wherein the moving trajectory of the camera is determined further by using at least one of an Inertial Navigation System (INS) and a Real Time Kinematic (RTK) GPS.

5. The method of claim 2, wherein the updating the high definition map includes:
dividing, into grids, each of the local landmark map and an area of the high definition map corresponding to the local landmark map;
comparing each grid of the local landmark map with each grid of the area of the high definition map; and
determining whether to update the high definition map based on a result of the comparison.

6. The method of claim 2, wherein the updating the high definition map includes:
fitting the second landmark into the second local landmark map based on the estimated three-dimensional position of the second landmark; and
updating the high definition map based on the second local landmark map where the second landmark is fitted.

7. The method of claim 6, wherein the fitting the second landmark includes:
dividing the second local landmark map into grids; and
fitting the second landmark by a polynomial using adjacent grids among grids corresponding to the estimated position.

8. The method of claim 2, wherein the generating the second local landmark map includes:
matching the high definition map with the first local landmark map; and
estimating the three-dimensional position of the second landmark in the matched first local landmark map.

9. The method of claim 8, wherein the matching the high definition map with the first local landmark map includes:
detecting a correspondence between landmarks in the high definition map and the first local landmark map; and
verifying the detected correspondence based on a positional relationship of at least three landmarks in each of the high definition map and the first local landmark map corresponding to each other.

10. The method of claim 8, wherein the estimating the three-dimensional position of the second landmark includes:
dividing an area corresponding to the moving trajectory of the camera in the high definition map into a plurality of grid planes;
acquiring a vector from an origin of a camera coordinate system to a pixel corresponding to the second landmark in the two-dimensional image; and
estimating the three-dimensional position of the second landmark based on intersection points of straight lines determined from the acquired vector and the plurality of the grid planes.

11. The method of claim 10, wherein the dividing the area corresponding to the moving trajectory of the camera into a plurality of the grid planes includes:
determining, for a first grid plane including at least four position information among a plurality of the grid planes, an equation of the first grid plane based on the at least four position information; and
determining, for a second grid plane including at most three position information among a plurality of the grid planes, the equation of the first plane adjacent to the second grid plane as an equation of the second grid plane.

12. The method of claim 8, wherein the estimating the three-dimensional position of the second landmark comprises estimating a plurality of three-dimensional positions of the second landmark from a plurality of two-dimensional images acquired by separate cameras, and
wherein the generating the second local landmark map further includes determining validity of the three-dimensional position of the second landmark by accumulating a plurality of the estimated three-dimensional positions.

13. The method of claim 12, wherein determining validity of the three-dimensional position of the second landmark includes:
accumulating a plurality of the estimated three-dimensional positions of the second landmark in the first local landmark map divided into a plurality of grids; and
determining, among the plurality of grids, a grid where an accumulation value is equal to or higher than a predetermined threshold value as a valid three-dimensional position of the second landmark.

14. A non-transitory computer-readable storage medium including computer executable instructions, wherein the instructions, when executed by a processor, cause the processor to perform a high definition map updating method comprising:
capturing two-dimensional images at a plurality of different locations by using a camera mounted on a vehicle;
determining a moving trajectory of the camera for capturing the two-dimensional images by at least comparing pixel locations of a first landmark other than lane markings within the two-dimensional images;
generating a three-dimensional first local landmark map corresponding to the moving trajectory of the camera by using the first landmark;
generating a second local landmark map by estimating, based on surface information of a road in the high definition map, a three-dimensional position of a second landmark of a lane marking around the moving trajectory of the camera; and
updating the high definition map based on the second local landmark map.

15. The non-transitory computer-readable storage medium of claim 14,
wherein the generating the three-dimensional first landmark map includes:
capturing the first landmark at a first location to obtain a first image,
capturing the first landmark at a second location to obtain a second image,
determining a first vector passing, from the first location, through a first pixel $X_1$ corresponding to the first landmark on the first image,
determining a second vector passing, from the second location, through a second pixel corresponding to the first landmark on the second image,
estimating an intersection of the first vector and the second vector, and
determining a three-dimensional position of the first landmark based on the estimated intersection.

16. The non-transitory computer-readable storage medium of claim 14, wherein the generating the second local landmark map includes:
matching the high definition map with the first local landmark map; and
estimating the three-dimensional position of the second landmark in the matched first local landmark map.

17. The non-transitory computer-readable storage medium of claim 16, wherein the matching the high definition map with the first local landmark map includes:
- detecting a correspondence between landmarks in the high definition map and the first local landmark map; and
- verifying the detected correspondence based on a positional relationship of at least three landmarks in each of the high definition map and the first local landmark map corresponding to each other.

18. The non-transitory computer-readable storage medium of claim 16, wherein the estimating the three-dimensional position of the second landmark is estimating a plurality of three-dimensional positions of the second landmark from a plurality of two-dimensional images acquired by separate cameras, and
- wherein the generating the second local landmark map further includes determining validity of the three-dimensional position of the second landmark by accumulating a plurality of the estimated three-dimensional positions.

19. The non-transitory computer-readable storage medium of claim 16, wherein the estimating the three-dimensional position of the second landmark includes:
- dividing an area corresponding to the moving trajectory of the camera in the high definition map into a plurality of grid planes;
- acquiring a vector from an origin of a camera coordinate system to a pixel corresponding to the second landmark in the two-dimensional image; and
- estimating the three-dimensional position of the second landmark based on intersection points of straight lines determined from the acquired vector and the plurality of the grid planes.

20. The non-transitory computer-readable storage medium of claim 19, wherein the dividing the area corresponding to the moving trajectory of the camera into a plurality of the grid planes includes:
- determining, for a first grid plane including at least four position information among a plurality of the grid planes, an equation of the first grid plane based on the at least four position information; and
- determining, for a second grid plane including at most three position information among a plurality of the grid planes, the equation of the first plane adjacent to the second grid plane as an equation of the second grid plane.

* * * * *